United States Patent Office 3,486,767
Patented Dec. 30, 1969

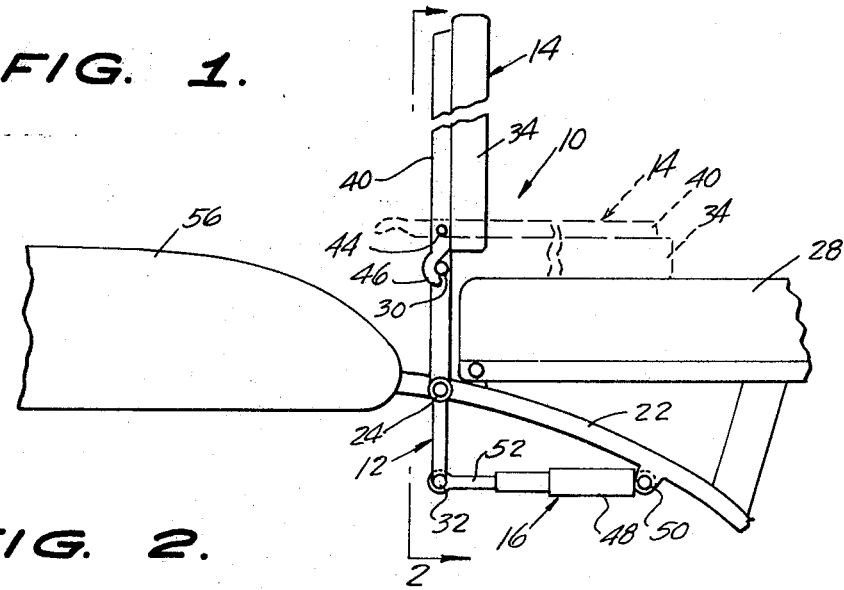
FIG. 1.
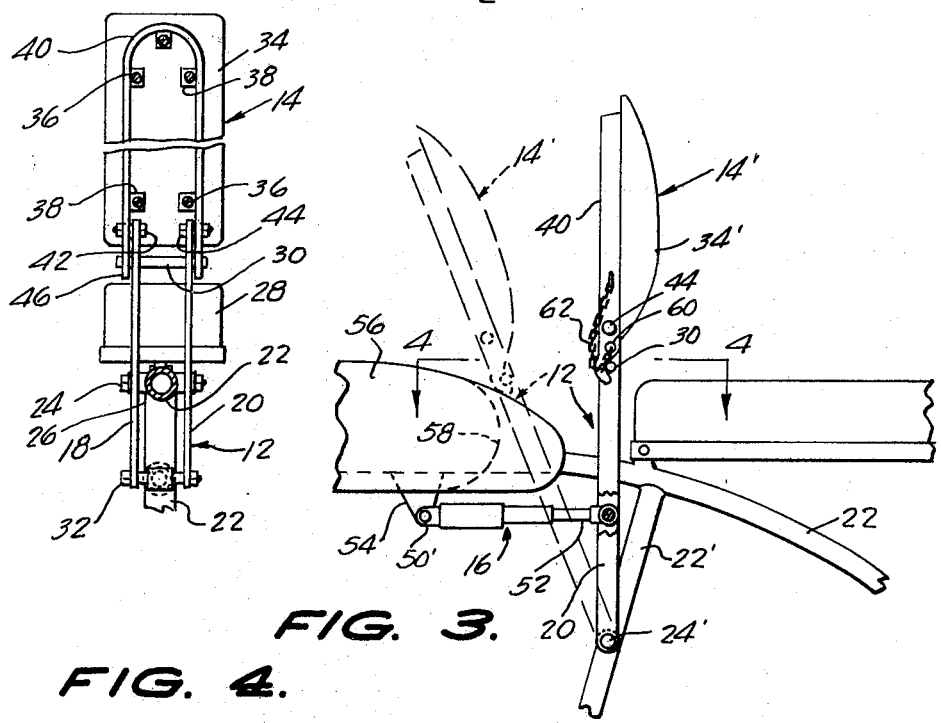
FIG. 2.
FIG. 3.
FIG. 4.
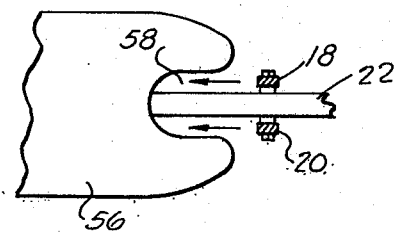
INVENTOR.
FRANK J. LUJAN,
BY
Berman, Davidson & Berman,
ATTORNEYS.

3,486,767
SAFETY DEVICE FOR MOTORCYCLE OPERATOR
Frank J. Lujan, 824 Silver SE.,
Albuquerque, N. Mex. 87102
Filed Mar. 1, 1968, Ser. No. 710,242
Int. Cl. B62j 27/00, 39/00
U.S. Cl. 280—289                               5 Claims

ABSTRACT OF THE DISCLOSURE

A safety device for a motorcycle driver, comprising a lever extending vertically in front of the motorcycle seat and pivoted to a frame portion below the seat, a cushioning member pivotally secured to the upper end of said lever for swinging to an out of use position overlying the top of the seat and to an operative safety position in line with said lever and covering the abdominal and chest portions of the driver, latching means on the lever for preventing said cushioning member from swinging forwardly of its safety position without carrying the lever, and shock absorber means pivotally secured at one end to a lower portion of said lever and secured at its other end to a frame portion to oppose forward swinging movement of the cushioning member and lever means upon forward lunging of the motorcycle driver.

This invention relates generally to safety devices for vehicles, and more particularly to a safety device for use on a motorcycle to protect the driver against injury upon collision, or when the vehicle is suddenly decelerated for any other reason.

Many motorcyclists have suffered serious injury, and even death, by being hurled over the handlebars upon sudden collision, or upon sudden deceleration due to sudden braking, or other reasons.

It is a primary object of the present invention to provide a safety device to prevent injury to a motorcyclist in the form of a cushioning pad positioned to cover the abdominal and chest portions of the motorcyclist whose forward movements will be retarded by a shock absorber operatively connected to the pad to resiliently oppose such forward movements.

Another object of the invention is to provide a safety device which is adapted to be mounted on the frame of the motorcycle and in front of the driver, the device having a cushioning pad against which the driver may lean during normal operation of the motorcycle, the cushioning pad being connected to a shock absorber which absorbs sudden lunges of the driver upon rapid deceleration of the motorcycle to prevent injury to the driver, and said cushioning pad being pivotally mounted to swing to an out of use position overlying the motorcycle seat when the motorcycle is not in use, or when the driver does not choose to avail himself of the safety feature.

Yet another important feature of the present invention is to provide a safety device, having the above-described characteristics, which is simple in construction, easy to install, efficient in its operation, and capable of being constructed of various rigid and strong materials, and which is relatively inexpensive to manufacture and install on a motorcycle.

A further object of the invention is to provide an improved safety device, having the above described characteristics, which is compact in size and when installed on a motorcycle occupies a minimum of space.

The novel features that are considered characteristic of the invention are set forth with particularity in the appended claims. The invention, itself, however, both as to its organization and its method of operation, together with additional objects and advantages thereof, will be understood from the following description of specific embodiments when read in connection with the accompanying drawing, wherein like reference characters indicate like parts throughout the several figures and in which:

FIG. 1 is a side elevation of a safety device according to the invention installed on a motorcycle, only portions of the cycle cooperating with the safety device being shown.

FIG. 2 is an end elevation with parts in section taken along the line 2—2 of FIG. 1, looking in the direction of the arrows;

FIG. 3 is a side elevation similar to FIG. 1 showing a modified embodiment of the invention; and FIG. 4 is a fragmentary, sectional, plan view taken on line 4—4 of FIG. 3, looking in the direction of the arrows.

Referring more particularly to the drawing, the improved safety device is generally characterized by the reference numeral 10 and is shown to comprise a lever means 12, a cushioning member 14, and a shock absorber 16.

The lever means 12 may comprise a pair of spaced vertical bars 18, 20 which straddle the central frame 22 of the motorcycle and which are centrally pivoted thereto by the bolt 24 extending through apertures in the bars and through a sleeve, or tracer element 26, welded, or otherwise fixed to the frame at a point just forward of and below the motorcycle seat 28. The upper end portions of the bars are connected by a transverse pin 30 protruding somewhat from the outer sides thereof to perform a latching function, as will be described hereinafter. The pin may be soldered, welded, or otherwise affixed to the vertical bars. The lower end portions of the pair of bars 18, 20 are similarly connected by a transverse pivot bolt 32 which functions as a hinge securing element for the shock absorber, as will be later described.

The cushioning member 14 comprises a pad 34 formed of sponge rubber, or other suitable resilient material, and may be covered with a fabric, or leather covering, not shown, and affixed by screws 36 to a plurality of lugs 38 formed on an inverted U-shaped member 40 whose lower portion is pivoted to the upper ends of the bars 18, 20 by the bolts 42, 44. The lower ends of the U-shaped member 40 below hinge bolts 42, 44 are bent and curved into hooks 46 which, in the raised position of the cushioning member 14, engage the ends of the pin 30 to latch the cushioning member and lever 12 together for further forward movement. The cushioning member 14 is, however, pivotable rearwardly without hindrance by the pin 30 to an out of use position in which the pad 34 overlies the top surface of the motorcycle seat 28, as shown in broken lines in FIG. 1.

The shock absorber 16 comprises a cylinder 48 pivotally secured to the frame 22 by a hinge pin 50 and having a piston within the cylinder connected to a rod 52 which protrudes therefrom and whose free end is pivotally secured to the hinge pin 32 at the bottom of the lever 12. Within the cylinder, which may comprise any conventional shock absorbing device, is a spring, and/or a fluid urging the piston and piston rod to the left, as viewed in FIG. 1, and opposing the forward turning, or swinging, movements of the lever and cushioning pad on the motorcycle. One example of a conventional shock absorber which can be used is a cylinder containing a hydraulic fluid, such as oil, and a piston having a small passage therethrough to prevent rapid movement thereof in the cylinder. Another conventional shock absorber may be a cylinder having one or more coil springs opposing movements of the piston in the cylinder.

The safety device, as thus described, operates as follows. When not in use, the cushioning pad 34 may be swung downwardly to the broken-line position of FIG. 1 to conserve space and if desired, can be formed to cover a substantial part of the seat, for use as an auxiliary seat under certain circumstances. Normally, however, the cushioning pad would be swung to its FIG. 1 solid-line position, and the driver mounts the seat and drives with his abdomen and chest bearing against the cushioning pad, the forward movements of which are normally prevented by the biasing force of the shock absorber 16 linked to the lower end of the lever 12. In the event of any sudden forward lunge of the driver arising out of rapid deceleration of the motorcycle due to collision, or otherwise, the cushioning member and lever linked together by the latching means 30, 46 will swing forward slowly to absorb the shock of such lunge and thereby prevent the driver from being thrown forwardly over the handlebars of the motorcycle. In this way, serious injury to the driver is avoided.

In the embodiments shown in FIGS. 3 and 4 the device is, in all respects, as described above for the FIG. 1 embodiment, except as described below. The horizontal pivot 24 of the lever 12 has been moved to the lower end of the pair of vertical bars 18, 20 as shown at 24', and is secured in a radial strut 22' of the motorcycle frame. The shock absorber 16 extends forwardly of the lever 12 rather than rearwardly, having its cylinder connected to a bracket 54 by pivot 50' secured to the frame under the gasoline tank 56. The piston rod 52 is pivotally connected at 32' to the lever bars 18, 20 at a point above the horizontal pivot instead of below. Arranged as thus described, the shock absorber exerts its force rearwardly rather than forwardly, but because of the rearrangement of the various pivots on lever bars 18, 20 the cushioning member is biased rearwardly just as in the FIG. 1 embodiment. Additional changes are that the cushioning pad 34' of member 14' has been curved to fit the body contour of the cyclist when leaning forwardly, and a pair of latch pins 60 hanging by chains 62 from the arms of part 40 have been added for removable insertion through aligned openings, not shown, in the members 18, 20 and 40 to lock them together so that the cushioning member 14 can be latched in operative position and not need holding by body contact of the cyclist.

In both embodiments described above the gasoline tank 56 is preferably formed with a central recess 58 sufficiently large to receive the lever bars 18, 20 upon their forward movement. Thus, when the cushioning member actually pivots forwardly to absorb the shock of driver lunges, the lever 12 will enter the recess 58 in the gasoline tank as shown in broken lines in FIG. 3. The provision of the recess in the rear of the tank enables the tank to be placed in its normal position in front of the driver. However, it will be understood that other arrangements are readily possible utilizing a tank without a recess. For example, the tank could be moved to another location on the motorcycle frame; the lever means on the safety device can be designed to surround the tank rather than to intersect it upon movement; or the lever means may be designed to move forwardly on one side or the other of the tank.

While the invention has been described as being primarily useful for attachment to motorcycles to protect their drivers, it should be obvious that it may also be useful for other vehicles, such as bicycles, tricycles, and the like, and could even be applied to automobiles, and similar vehicles. In the last instance it would be merely necessary to arrange the lever in the same manner in front of the forward or rear seat of the passenger vehicle and connect the shock absorber and the lower end of the lever to supports located below the seat. As thus arranged the compact safety device, occupying little space, would be readily available for protection of the automobile passengers and the driver.

It should also be recognized that the described device may be used alone, or an auxiliary to other safety devices, such as foot or leg braces in the form of padded bars, not shown, placed on the frame on each side of the cycle and protruding about six inches therefrom between the ankle and the knee of the driver in back of his legs. Such leg braces would serve to hold the driver firmly between the leg braces and the chest cushioning pad 34.

Although certain specific embodiments of the invention have been shown and described, it is obvious that many modifications thereof are possible.

What is claimed is:

1. A safety device for a vehicle having a seat affixed to and above a frame portion, comprising lever means adapted to extend substantially vertically adjacent and forward of said seat and having a horizontal pivot means for attachment to said frame portion, a pad-like cushioning member pivotally secured to the upper end of said lever means for swinging to an out of use position overlying the top surface of said seat and to an in use safety position substantially in line with said lever means to cover the abdominal and chest portions of an occupant of the seat, latching means on said lever means for preventing said cushioning member from swinging forwardly of said safety position without carrying said lever means, and shock absorber means pivotally secured at one end to a lower portion of said lever means and adapted to be secured at its other end to said frame portion whereby to resiliently oppose forward swinging of the cushioning member and lever means about said pivot means upon rapid deceleration of the vehicle and forward lunging of an occupant of the seat.

2. A safety device according to claim 1, wherein said vehicle is a motorcycle having a seat and a frame, said lever means comprising a pair of bars for mounting one on each side of the frame and attachable thereto by said pivot means, an inverted U-shaped element pivotally attached to the upper ends of said pair of bars and mounting said cushioning member, said latching means including a transverse pin connecting said pair of bars and engageable with the lower ends of said U-shaped element to limit the swinging movement thereof in one direction.

3. A safety device according to claim 2 in combination with a motorcycle gasoline tank mounted on said frame in front of said seat and a pair of bars, said tank having a recess formed in its rear end adapted to receive said pair of bars during forward swinging thereof against the bias of said shock absorber means.

4. A safety device according to claim 3, wherein said other end of the shock absorber means is pivotally secured to a motorcycle frame portion underlying said gasoline tank.

5. A safety device according to claim 2, wherein said latching means further includes interfitting latching elements on said pair of bars and U-shaped element engageable with each other to limit relative swinging movement of the said bars and U-shaped element both forwardly and rearwardly.

References Cited

UNITED STATES PATENTS

| 1,113,833 | 10/1914 | Ruff | 297—353 X |
| 1,146,676 | 7/1915 | Weed. | |
| 2,008,448 | 7/1935 | Harr | 280—202 |
| 2,229,778 | 1/1941 | Taulbee | 280—290 |
| 2,320,344 | 6/1943 | Belanger | 280—202 |
| 3,198,543 | 8/1965 | Presunka | 297—390 X |

KENNETH H. BETTS, Primary Examiner

U.S. Cl. X.R.

280—150; 297—390